Patented Apr. 24, 1951

2,550,481

UNITED STATES PATENT OFFICE 2,550,481

BITUMINOUS COMPOSITIONS

Willem Frederik Jense, Amsterdam, Netherlands, assignor to Shell Development Company, San Francisco, Calif., a corporation of Delaware No Drawing. Application June 2, 1947, Serial No. 751,991. In the Netherlands April 6, 1944

Section 1, Public Law 690, August 8, 1946
Patent expires April 6, 1964

9 Claims. (Cl. 252—311.5)

This invention relates to bituminous compositions and more particularly it relates to improvements in the emulsion characteristics of asphalt and other bituminous materials.

Bituminous dispersions have been known for some time, and extentive quantities thereof are produced commercially at the present time in accordance with certain of the better known and more practical methods available in the art. These dispersions possess certain well-defined properties which are, to a considerable extent, governed by the nature of the bitumen and the character of the material used as the dispersing agent.

The stability of these dispersions is one of the properties which plays an important part or role in their commercial application. For certain industrial uses, for example, the dispersion is required to be exceedingly stable, not only to thermal influences or contact with acidic or basic aggregate, but especially to ordinary storage. Thus, some of these dispersions are used in the manufacture of fibrous products, and where these processes are carried out on the ordinary paper making machines, it is necessary that the dispersion be highly stable in order that it may not be broken by the mechanical influences to which it is subjected during the paper making operation.

In numerous other instances, especially where emulsions are used in road-building operations, it is advantageous to be able to stock-pile the emulsion. Also in such operations it usually becomes necessary to admix with the emulsions certain other materials and if the former are of a comparatively unstable variety difficulty may be encountered in admixing the other substances therewith because of the tendency of the latter to break down the dispersions before the admixing has been completed. Thus, for example, where it is desired to admix asbestos with ordinary soap dispersions of bitumen, the latter is usually instantly broken down upon the addition of the asbestos thereto. Similarly, lamp black, Portland cement, and certain pigments when added to ordinary soap emulsions of asphalt break the emulsion almost immediately.

Bituminous materials derived from a variety of sources have differing inherent abilities to emulsify readily in an alkaline medium, and to remain in a stable dispersion once such is formed. It has been postulated that one factor controlling these characteristics is the identity and amount of naturally occurring acids, believed by some investigators to be naphthenic acids of high molecular weight, which may be present. Certain asphaltic materials are substantially free of such acids, and it has been noted that they have extremely poor inherent emulsification characteristics.

Numerous attempts have been made to improve the emulsion characteristics of such bituminous materials. Among the long list of substances added to bitumens for this purpose have been clays, especially bentonite, and organic acids, such as higher fatty acids, naphthenic acids or sulfonic acids. Whenever such acids are added to the bitumen, dispersion is usually effected by admixing the latter with an aqueous alkaline medium, thus forming a soap in situ. Alternatively, the soaps have been preformed and mixed with either the asphalt or water either prior to or during emulsification. However, there has been a puzzling lack of sufficient response to this type of treatment. For example, the addition of fatty acid soaps, such as potassium oleate, to asphalts of low acid number results in compositions which emulsify readily enough, but which create emulsions of relatively coarse particle size. It has been found that the stability of asphalt emulsions usually varies inversely with the average particle size of the emulsion. In accordance with this theory it has been found that the emulsions containing ordinary fatty acid soaps are unstable, and easily break on standing or upon contact with various materials such as stone or asbestos.

Likewise, soaps of naphthenic acids have been added to asphalts to aid in emulsification. However, it has been found that the emulsion must be highly alkaline in order to permit emulsification in the presence of added naphthenic acids, and additionally, such emulsions are only slightly less coarse than those described above, and are just about as unstable.

Various modified materials have been tried, such as hydroxy acids. These, due apparently to their free hydroxyl groups, are sufficiently attracted to the aqueous phase of the system that they act as poor emulsifying agents and emulsions containing them are particularly sensitive to the so-called demulsibility test, wherein the emulsion is treated with calcium chloride. Other modified materials which have been investigated include various hydrocarbon polymers and polymers of unsaturated acids. These likewise impart a certain degree of emulsion stability, but are sensitive to temperature changes, and the presence of multivalent ions such as calcium. Furthermore, on standing, their emulsifying ability slowly decreases, due apparently to alteration of residual double bonds in the polymer or to other allied causes.

It is an object of this invention to improve bituminous compositions. It is another object to improve the stability of asphalt emulsions. A third object is the creation of asphalt emulsions of extremely fine particle size. Still another object is the improvement of the emulsion characteristics of asphalts having low acid numbers. Other objects will appear hereinafter.

Now, in accordance with this invention, it has been found that the emulsion characteristics of bitumens are improved to an unexpectedly superior degree by the incorporation therewith or formation therein of a soap of a polymerized hydroxyalkyl carboxylic acid.

These polymerized acids may be prepared from monomers of any molecular weight, but the polymer prepared therefrom should be substantially soluble or dispersable in bitumen. Preferably, the monomeric acid is one having more than fourteen carbon atoms in the hydroxyalkyl radical. However, lower molecular weight monomers may be used as long as the polymers derived therefrom have at least about twenty carbon atoms.

Suitable monomers which may be used in the preparation of the subject polymeric emulsifying agents include the lactic acid series, which are monobasic, monohydroxyalkyl carboxylic acids having the general formula $$C_nH_{2n}(OH)COOH$$

wherein $n$ is an integer preferably greater than fourteen. Typical preferred members of this group include 2-hydroxyoctadecanoic acid, 3-hydroxyoctadecanoic acid, 10-hydroxyoctadecanoic acid, 11-hydroxyoctadecanoic acid, 12-hydroxyoctadecanoic acid, 4-hydroxypentadecanoic acid, 6-hydroxypentadecanoic acid, 8-hydroxypentadecanoic acid, 5-hydroxyhexadecanoic acid, 7-hydroxyhexadecanoic acid, etc. The most preferred member of the above group for use in the present compositions is 12-hydroxyoctadecanoic acid.

Another suitable class of acids are the dihydroxy monocarboxylic acids, such as 9,10-dihydroxyoctadecanoic acid. Other types of acid which may be used for the present purpose are the mono- and di-hydroxydicarboxylic acids, such as 2-hydroxydecanedioic acid and 2,7-dihydroxydecandioic acid.

The polymers of the above types of acids are characterized by linkages through the hydroxyls attached to the alkyl radicals. Thus, in their most simple form, the polymers have units of the essential configuration

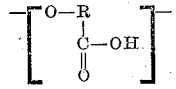

wherein R is a completely saturated hydrocarbon radical. Dependent upon the conditions of polymerization, some of the units in each polymer chain may have been decarboxylated. An important feature of these polymers is that the units thereof are linked almost entirely through carbon-to-oxygen bonds, rather than carbon-to-carbon bonds, and that they contain no appreciable proportion of unsaturated linkages. It has been discovered, in accordance with one phase of this invention, that these two features are essential for the production of bituminous emulsions having maximum stability and minimum demulsibility.

Acids of the above character may be polymerized in a number of ways. Preferred methods include thermal polymerization, catalyzed polymerization and voltolization. In the process of thermal polymerization, the acid is heated at temperatures from about 125° C. to about 250° C. for periods ranging from about one-half to sixteen hours or longer. In the process of catalyzed polymerization, active catalysts such as boron trifluoride are preferred. Copolymers may be prepared by polymerizing two or more of the above acids. The products which are preferred in the compositions of the present invention are those having at least about twenty carbon atoms, and those having from about thirty to forty-five carbon atoms are preferred.

The soaps of the above polymeric acids may be either soaps of alkali metals or of alkaline earth metals, including sodium, potassium, lithium, calcium, magnesium, etc. The alkali metal soaps, and particularly the potassium soaps, have been found to be most effective in the compositions of the present invention.

The subject polymeric emulsifying agents may be formed prior to use in the bituminous compositions, or they may be formed in situ. The latter is the preferred practice. Thus, one or more of the polymeric acids may be dispersed in a bitumen, after which an aqueous solution of a base is added, such as dilute potassium hydroxide. The mixture is rapidly stirred or passed through a colloid mill, the soap formed by interaction of the base and the polymeric acid causing or enhancing emulsification of the bitumen and water.

Various types of bitumens may be improved by the presence of the above polymeric emulsifying agents. As pointed out hereinbefore, the greatest improvement is shown by addition of these polymers to bitumens having low acid numbers, even as low as 0.5 or less. However, the emulsion characteristics of other bitumens having higher acid numbers may be improved according to the present invention. Hence, among the bituminous substances considered herein are bitumens, pyrobitumens, pyrogenous distillates and tars, and pyrogeneous residues such as pitch or pyrogenous asphalts, as well as native asphalts and asphaltites. These include especially asphalts having their origin in Iraq, Mexico, Trinidad, Venezuela, Colombia, Spain and the Dutch East Indies. Dependent upon the purpose for which the emulsion is to be used, the bituminous material may be of varying hardness or penetration.

In the following example, the effective use of one of the polymeric emulsifying agents of the present invention is compared with two typical agents known to the art, namely soaps of naphthenic acids and of oleic acid.

A polymeric acid was formed by heating 12-hydroxyoctadecanoic acid for one hour at 180° C. An Iraq asphaltic bitumen was used in the tests described below. This asphalt had a penetration of 150 at 25° C., a Ring and Ball melting point of 42° C., and an acid number of 0.1. This asphalt was emulsified in aqueous potassium hydroxide, using no emulsifying agent in one case (Example 1) and oleic acid, high molecular weight naphthenic acids and the above polymeric acid as emulsifying agents in Examples 2, April 24, 1951   E. F. W. ALEXANDERSON   2,550,514
SYSTEM FOR REPRODUCING POSITION
Original Filed May 19, 1932   3 Sheets-Sheet 1
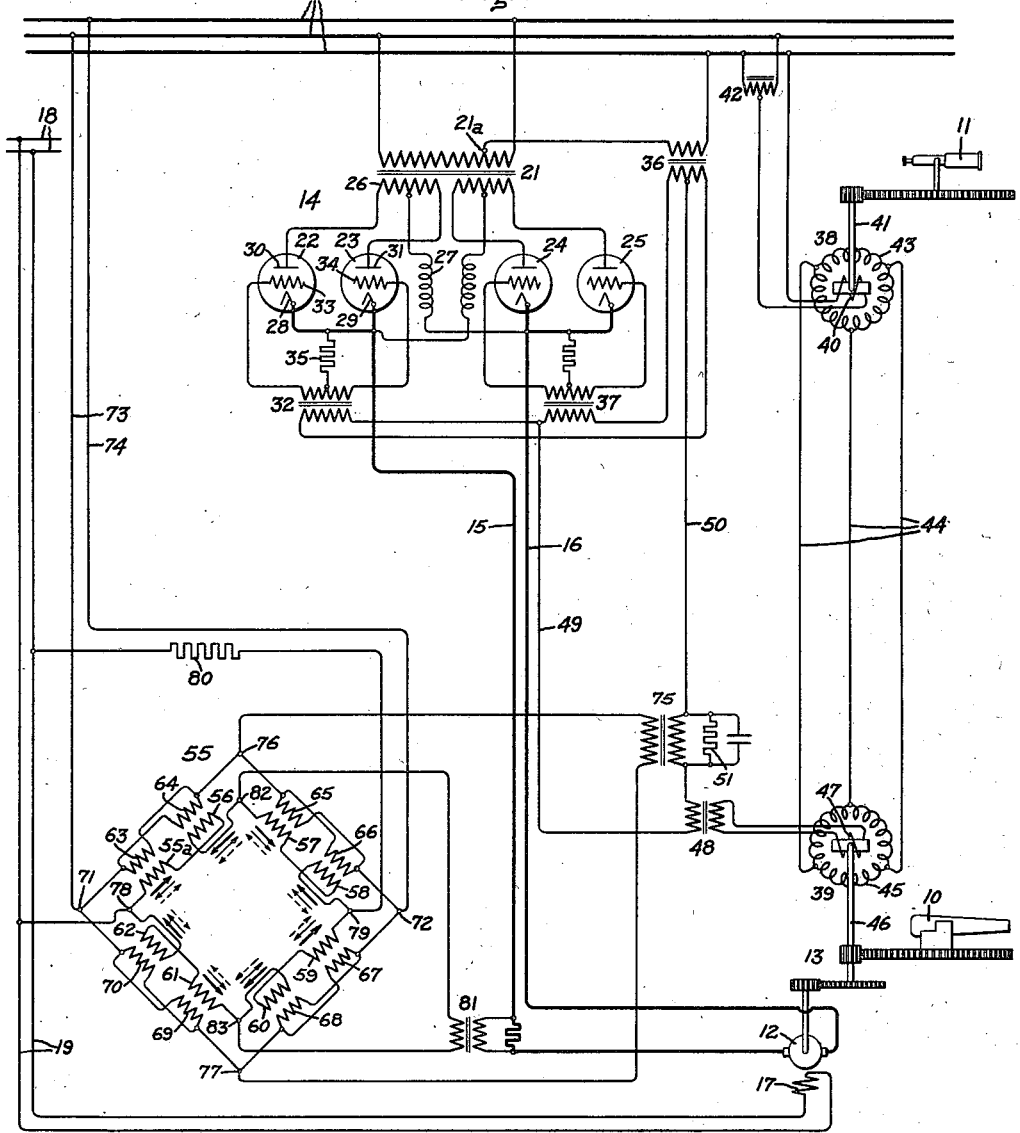
Fig. 1.
Fig. 2.
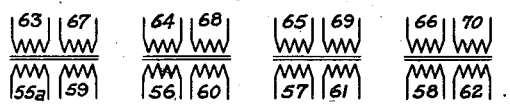
Inventor:
Ernst F. W. Alexanderson,
by Charles E. Tullar
His Attorney.